PROCESS FOR PURIFYING MONOMERIC POLYGLYCIDYL COMPOUNDS

Charles A. Fetscher, Olean and John J. Gapa, Bolivar, N.Y., assignors to The Dexter Corporation, Windsor Locks, Conn.
No Drawing. Filed Jan. 10, 1972, Ser. No. 216,737
Int. Cl. C07d 1/18, 1/00
U.S. Cl. 260—348 R                 7 Claims

ABSTRACT OF THE DISCLOSURE

Monomeric polyglycidyl compounds contaminated with dimers, trimers and ionic materials are readily and simply purified by triturating the impure compounds in a suitable solvent to dissolve the dimers and trimers and thereafter separating the solvent containing the dissolved contaminants to rapidly recover a solid compound which is substantially purely monomeric. The recovered product can be suspended in water and washed free of ionic contaminants more readily than can be a resinous material.

---

This invention relates to a novel process for purifying monomeric polyglycidyl compounds and to the products obtained therefrom.

BACKGROUND OF THE INVENTION

Commercially available, liquid bisphenol A epoxy resins, such as those having epoxy equivalent weights (EEW) of from about 172 to 187, viscosities of from about 3,000 to 6,400 cps. at 25° C., and total chloride contents of from about 0.10% to 0.90%, are almost pure diglycidyl ethers of bisphenol A. These compounds tend to crystallize during storage and, while this is usually not desirable, these crystalline materials do possess useful properties. Nonetheless, it is known to be difficult to recover the pure crystalline diglycidyl ethers as free-flowing, non-sintering powders from these commercial products.

While the preparation of epoxy resins having 80% to 90% of their molecules of the same size is readily realizable, they tend to condense and increase in size, apparently due to the conditions under which they are manufactured. In commercial production, these epoxy resins are intended to be produced in their smallest molecular size, but invariably they include some molecules which are twice as large as the theoretical smallest molecule and some which are higher multiples of the molecular weight. Consequently, most products are mixtures of different molecular sizes and this tends to inhibit solidification. If these epoxy resin products do crystallize, they are sticky as a result of being contaminated with a coating of polymeric material and also have lower melting points.

Utilizing the theoretical preparation of the diglycidyl ether of bisphenol A as an example, these factors can be illustrated by the following, representative reactions:

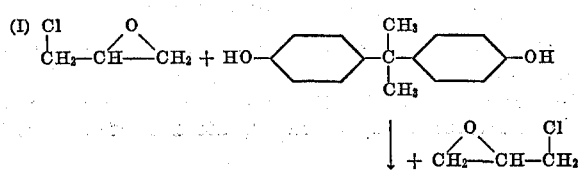

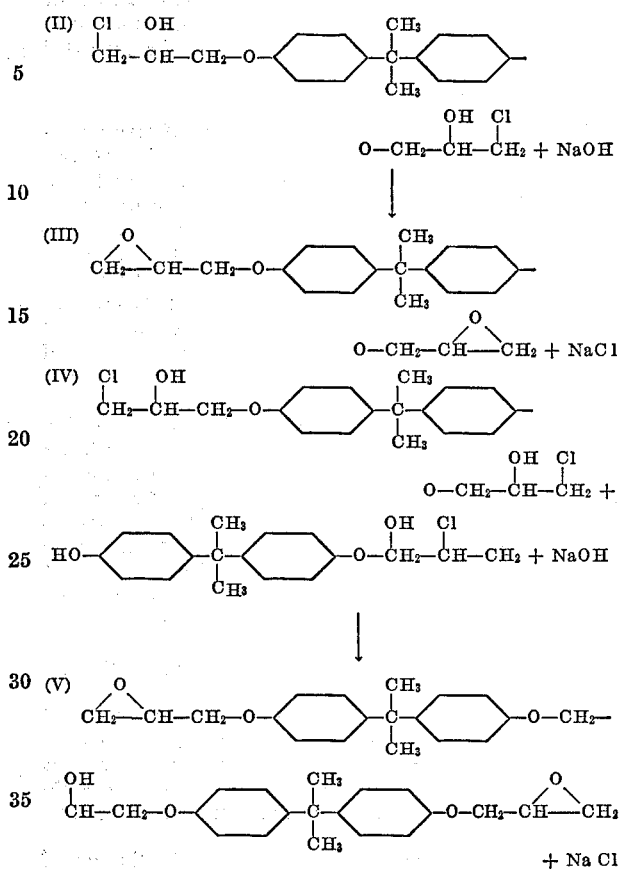

In (I), (II) and (III) above the theoretical preparation of the diglycidyl ether of bisphenol A is shown wherein two mols of epichlorohydrin are combined with bisphenol to yield a di-(propyl chlorohydrin ether) of bisphenol A [(I) and (II)]. This (II) is then combined with an alkali (NaOH) to remove HCl and obtain the diglycidyl ether shown in (III). Invariably, however, some propylchlorohydrin (II) or even the diglycidyl ether (III) reacts with some residual phenolic groups, as shown in (IV), to yield a higher homologue of the diglycidyl ether as shown in (V), and it should be noted that the higher homologue always contains a hydroxyl group. Consequently, low viscosity, liquid bisphenol A resins are from about 75% to 90% monomeric and contain from about 10% to 25% of the higher homologues.

This buildup of higher homologues also occurs in the preparation of glycidyl ethers of other phenols or alcohols and glycidyl esters of acids. The desired monomers, therefore, always contain at least a few percent of materials having higher molecular weights and, while those homologous fractions are compatible and miscible, the resultant mixture exhibits a much lower melting point than the pure product.

It is known that the diglycidyl ether of bisphenol A can be purified by recrystallization from a few solvents. These processes generally involve permitting the solution to stand over an extended period of several days at low temperature until the crystals form. More recently, several improvements over this method have been disclosed such as in U.S. Pat. 3,093,661 to Fourie et al., U.S. Pat. 3,095,429 to Smith et al., and U.S. Pat. 3,413,320 to Cofer. However, the methods of crystallization revealed in these exemplary prior art disclosures still require that the solution stand for extended periods at low temperatures before the crystallized product can be recovered.

U.S. patent to Parry (3,400,098) is noteworthy for its disclosure of crystalline diglycidyl ether of bisphenol A in a one-component system.

The prior art, as exemplified by the above-noted patents, leaves much to be desired in the methods presently employed for obtaining free flowing crystalline, or powdered polyglycidyl products having high monomeric purity so that their usefulness can thereby be expanded to other systems.

THE INVENTION

It has now been found that epoxy resins of high monomeric purity can be quickly, readily and simply obtained through the method of this invention. In general, this method involves converting a semi-solid, epoxy resin compound having a high monomeric content into a non-tack solid by vigorously rubbing and grinding the compound in a suitable solvent to dissolve resinous contaminants; and, separating the solvent and dissolved contaminants to rapidly recover said epoxy resin compound as a solid, substantially completely monomeric compound which is non-tacky and non-sintering at room temperature.

By this simple method, commercially available bisphenol A resins having low viscosities and which are rich in monomeric diglycidyl ether content can be easily and quickly converted into free flowing powders at high yields. This process is equally applicable to other monomeric-type resins since their preparation from simple glycidyl derivatives inevitably includes the formation of some dimers and trimers. As noted earlier, these homologues are compatible with the monomer and interfere with crystallization of the desired product.

As used throughout this application and in the appended claims, the term "pure," and various modifications thereof should be understood as referring to the removal of all, or nearly all, the contaminating dimers and/or trimers of monomeric glycidyl derivative products. The thus purified products can be further improved by washing them with deionized water to essentially remove ionic contamination.

As a definitive measurement of purity, the theoretical equivalent weight of the compound is used as an arbitrary standard, and a compound is considered to be 99% pure when its equivalent weight is within 1%; that is, ±1%, of its theoretical equivalent weight. Hence, by the process of this invention, products whose equivalent weights are within about 5% of their theoretiacl value are also considered to be "pure."

The term "grinding" as used throughout this application and in the appended claims should also be understood as referring to the vigorous rubbing and mixing of the monomeric compound in a suitable solvent whereby the waxy lumps of monomeric material, which can be in solid or semi-solid form, are broken up.

Consequently, the process of this invention is generally directed toward the purification of epoxy resins, and, more specifically, to those monomers having the smallest molecular weight polyglycidyl compounds of a given type; that is, monomeric polyglycidyl compounds. Exemplary of such compounds are the diglycidyl ether of bisphenol A, diglycidyl esters of tetrachloro- and tetrabromo-phthalic acid, N,N-diglycidyl tribromo analine, tetraglycidyl methylene bis resorcinol, and the like.

As previously noted, the higher homologues of these monomeric compounds always contain at least one hydroxyl group and it is believed that it is these hydroxyl groups which render these compounds more soluble in a suitable solvent than is the monomeric material itself which contains no hydroxyl group. Nonetheless, the difference in solubility is not large and it has been found that polyglycidyl compounds containing a high percentage of homologues cannot be effective purified by the process of the invention. An additional factor for consideration, therefore, is the amount of homologues in the monomer to be purified. In general, the compound to be purified must already contain a large amount of the desired monomeric resin and a relatively small amount of contaminating homologues. Hence, it has been found that those polyglycidyl compounds containing at least about 80% of the desired monomeric resin are the ones which can be purified by the process of the invention.

It should be noted that use of the term "monomeric" herein is not concerned with the functionality of the compound to be purified. With reference to the foregoing reactions representing the theoretical preparation of bisphenol A, for example, it will be seen that the monomer of (III) is difunctional as is the higher homologue of (V). And in the examples that follow, it will be seen that one of the monomers purified is tetrafunctional (tetraglycidyl methylene bis resorcinol).

It should be further noted that the monomeric compounds for which the process of the invention is intended are those which, when purified, are solid. Some of the glycidyl ethers of alcohols are liquids having relatively low melting points and no amount of purification by the present process will render these materials solid. Hence, the polyglycidyl monomeric compounds to be purified are those which, when pure, are solids having melting points of at least about 35° C.

The solvent which can be employed in the process of the invention can be a solvent which has a low boiling point, such as the lower alcohols as, for example, ethanol, methanol, and the like, and which will, therefore, have a tendency to evaporate from the product at a fast rate. Of these, methanol is the preferred solvent for use.

In accordance with the process of this invention, it has been found that by merely triturating; that is, vigorously rubbing and grinding, the impure, pasty monomeric compounds in methanol results in quickly obtaining products of extremely high purity. Hence, the pasty monomeric starting materials which are subjected to the process of the invention are not dissolved, nor does the process of the invention require that they stand in solution for prolonged periods of time at low temperatures before recovering the crystalline product. As noted earlier, all of the impure compounds contain hydroxyl groups which are readily soluble in methanol without dissolving the compound itself, while methanol appears to be a poor solvent for those monomeric compounds free of hydroxyl groups.

A particularly important property which the purified powdered compounds of the invention exhibit is that they can be readily washed with water in powdered form and can be repeatedly water washed until almost free of ionic contamination. The purified compounds of the invention are, therefore, ideal for use as starting materials in the preparation of pure resins of various molecular weights employed in electronic applications where ionic impurities are undesirable. Since these purified powdered compounds are relatively unreactive at low temperatures, they can be readily utilized to provide stable, one-component systems.

Various aspects of the invention will become more apparent when considered in light of the following examples which are set forth as being merely illustrative of the invention and should not be construed as being limitative thereof.

Example I—Diglycidyl ether of bisphenol A

The preparation of diglycidyl ethers of bisphenol A is well known as exemplified by U.S. Pats. 2,467,171 to Werner et al. and 2,651,589 to Shokal et al., as well as in the Handbook of Epoxy Resins, Lee and Neville, 1967

(pp. 2–4). Consequently, in this example a commercially available diglycidyl ether of bisphenol A available under the trademark "Epi-Rez 508" was employed. This resin had an EEW of about 173, a viscosity of about 4,000 cps. at 25° C., and a total chloride content of 0.20%.

The above identified diglycidyl ether of bisphenol A was obtained in the form of tacky, waxy lumps accompanied by some liquid resin. 400 g. of it was placed in a large mortar then covered with methanol and manually crushed and ground with a pestle. After the lumps had been substantially reduced in size, the methanol was decanted off and replaced with fresh methanol and the manual crushing and grinding continued until a fine powder was obtained in a slurry. The slurry was then vaccum filtered on a large Büchner funnel after which air was draw through the filter for a period of 10 minutes in order to evaporate off the methanol. Following this, there was recovered 374.5 g. of wet powder which was then slurried in about three times its own volume in deionized water at room temperature for about 15 minutes. The slurry was again filtered and washed four more times with deionized water. Following the last filtration, the powder in the Büchner funnel was covered with a rubber dam in order to squeeze it dry until it was substantially free of water. From this, 353 g. of a wet, white powder were recovered which was then transferred to an aluminum tray and allowed to air dry for a period of 60 hours.

Upon being dried, there was recovered 316.5 g. of a dry, white powder representing a yield of 79% of the starting material. The recovered dry, white powder did not sinter or block at room temperature, had a melting point of between about 40° to 42° C., an EEW 170.5, as opposed to a theoretical EEW of 170, and revealed a total chloride content of 0.02%.

Example II—Diglycidyl ester of tetrachlorophthalic acid

Fifteen mols of epichlorohydrin and 0.1% by weight of the epichlorohydrin of tetramethyl ammonium bromide were placed under a $N_2$ blanket in a 3 liter resin kettle equipped with thermometer, stirrer and reflux condenser. The mixture was heated to 50° C. whereupon one-half mol of tetrachlorophthalic anhydride was added, followed by heating the mixture of 85° C. whereupon one-half mol water was added. Heating was continued until a mild exotherm was observed after a few moments at about 85° to 90° C., and the mixture, now in solution, darkened. At this time, the solution was heated to reflux and then refluxed for three hours after which the solution was cooled with a cold water bath to 50° C. whereupon 2 mols of finely ground NaOH was added to it. The solution was then heated to 90° C. and allowed to stand and cool to room temperature at which time it was vaccum filtered and the filter cake obtained was discarded. The filtrate was then transferred to a flask and held to a temperature below 50° C. while being subjected to vacuum by water aspiration for a period of about 25 minutes in order to remove volatiles. The resultant residue was a brown, viscous liquid which, after being permitted to stand overnight, was observed to be semi-solid.

This residue, which had the appearance of a thick slurry of brown sand in a brown liquid, was then manually vigorously crushed and ground in about an equal volume of methanol until it become a powder having a light brown color. This powder was filtered, and again ground under methanol whereupon it turned white. The white powder was then dried at 50° C. for a period of about 3 hours.

Upon analysis, it was determined that the white powder represented a yield of about 33% based upon the total amount of tetrachlorophthalic anhydride employed but represented a yield of about 75% by weight of the brown, viscous, liquid residue obtained as described above. The melting point of the white powder was found to be about 124° C. and had an EEW of 212 as opposed to a theoretical EEW of 207 indicating that the white powder had a monomer content of about 97%.

Example III—Diglycidyl ester of tetrabromophthalic acid

The same procedures were followed as in Example II above, except that tetrabromophthalic anhydride was used in place of the tetrachlorophthalic anhydride. From this there was obtained a dark, brown, sandy paste upon permitting the residue to stand overnight. After grinding the paste twice under cold methanol, a white powder was obtained which was then dried as in Example II.

Analysis of this material revealed a yield of 40% based upon the total tetrabromophthalic anhydride used and a yield of 80% by weight of the dark brown, sandy past residue. Its melting point was found to be about 152° C. and its EEW was about 319 as compared to a theoretical EEW of 297 indicating that it contained about 95% monomeric diglycidyl ester.

Example IV—N,N-diglycidyl tribromoaniline

A commercial sample of N,N-diglycidyl tribromoaniline having a soft, buttery solid appearance and exuding a small quantity of liquid at room temperature was obtained. This material had an EEW of 281 as opposed to a theoretical EEW of 221 and completely melted within one hour at 40° C.

400 g. of the commercially obtained N,N-diglycidyl tribromoaniline was placed in a mortar with an equal volume of methanol and then manually vigorously crushed and ground. This mixture was then filtered and the recovered solid again vigorously crushed and ground. The mixture was then filtered, ground, and washed three more times using about 250 cc. methanol in each washing. The resultant powder was permitted to dry at room temperature for a period of about 24 hours after which there was obtained 277 g. of a white powder.

Analysis of this white powder revealed an EEW of about 231 as opposed to a theoretical EEW of 221, indicating a pure monomer content of about 96%, and had a melting point of from about 56° to 58° C.

Example V.—Tetraglycidyl ether of methylene bis-resorcinol

Into a resin kettle equipped with thermometer, stirrer and reflux condenser, there was placed, under a $N_2$ blanket, 20 mols of epichlorohydrin and one mol methylene bis-resorcinol. The mixture was then heated to reflux and, at reflux, 4 mols NaOH as a 25% solution in water were slowly added to the mixture over a period of about 2 hours as the addition of the alkali was accompanied by a vigorous exothermic reaction. The charge was then cooled to room temperature in a cold water bath, whereupon it separated into two liquid layers. The top liquid layer was discarded and the remaining liquid layer was then washed three times with equal volumes of distilled water to recover an amber colored, oily substance. This oily substance was then transferred to a flask and vacuum stripped of water and epichlorohydrin, while maintaining the temperature of the oily substance below 50° C. and there was obtained a viscous, amber liquid.

This amber liquid was then vigorously mixed and ground with one-half its volume of methanol. This mixing and grinding with methanol was repeated two more times; on the second mixing, a semi-solid product; that is, a soft sticky solid accompanied by some liquid, was obtained, while on the third mixing, a very light tan, powdered product was obtained. After being vacuum dried, this powdered product was found to have a melting point of from about 56° to 60° C., and an EEW of 123 as opposed to a theoretical EEW of 114.

As indicated earlier, some of the re-crystallization processes disclosed in the prior art suggest that the final crystals can be washed with a suitable, low boiling solvent to remove the less volatile, crystallization solvent. However, this does not suggest that washing with a suitable solvent as the sole treatment will result in obtaining a purified, non-sintering product as has been demonstrated in this invention.

What is claimed:

1. The process for increasing to at least about 95% the purity of a monomeric polyglycidyl epoxy resin that comprises crushing, grinding and rubbing in about an equal volume of methanol a monomeric polyglycidyl epoxy resin having a monomeric content of at least about 80%, and removing methanol and dissolved impurities from said resin by filtration to obtain a powdered crystalline resin having a melting point of at least about 35° C., and which does not sinter or fuse at room temperature.

2. The process of claim 1 wherein said epoxy resin is a monomeric polyglycidyl compound selected from the group consisting of diglycidyl ether of bisphenol A, diglycidyl ester of tetrachlorophthalic acid, diglycidyl ester of tetrabromophthalic acid, N,N-diglycidyl tribromo aniline, and tetraglycidyl methylene bis resorcinol.

3. The process of claim 1 wherein said epoxy resin is diglycidyl ester of tetrachlorophthalic acid.

4. The process of claim 1 wherein said epoxy resin is diglycidyl ester of tetrabromophthalic acid.

5. The process of claim 1 wherein said epoxy resin is N,N-diglycidyl tribromo aniline.

6. The process of claim 1 wherein said epoxy resin is tetraglycidyl methylene bis resorcinol.

7. The process of claim 1 wherein said epoxy resin is diglycidyl ether of bisphenol A.

References Cited

UNITED STATES PATENTS 3,413,320  11/1968  Cofer _____ 260—348

FOREIGN PATENTS 113,725  2/1965  Czechoslovakia _____ 260—348

OTHER REFERENCES

Houben-Weyl, vol. I/1 (1958) p. 309.
Chemical Abstracts, vol. 60 (1964), 5747g.

NORMA S. MILESTONE, Primary Examiner

U.S. Cl. X.R.

206—348 A